United States Patent
Husband et al.

(10) Patent No.: US 9,771,871 B2
(45) Date of Patent: Sep. 26, 2017

(54) FBO TORQUE REDUCING FEATURE IN FAN SHAFT

(71) Applicant: United Technologies Corporation, Hartford, CT (US)

(72) Inventors: Jason Husband, South Glastonbury, CT (US); Drew W. Lancaster, Hartford, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 306 days.

(21) Appl. No.: 14/792,927

(22) Filed: Jul. 7, 2015

(65) Prior Publication Data
US 2017/0009661 A1 Jan. 12, 2017

(51) Int. Cl.
| | |
|---|---|
| *F04D 29/043* | (2006.01) |
| *F02C 7/36* | (2006.01) |
| *F01D 5/02* | (2006.01) |
| *F01D 21/04* | (2006.01) |
| *F02C 3/04* | (2006.01) |

(52) U.S. Cl.
CPC .................. *F02C 7/36* (2013.01); *F01D 5/02* (2013.01); *F01D 21/045* (2013.01); *F02C 3/04* (2013.01); *F05D 2220/36* (2013.01)

(58) Field of Classification Search
CPC ........ F02C 7/36; F04D 29/043; F04D 29/053; F01D 5/02; F05D 2220/36
See application file for complete search history.

(56) References Cited

U.S. PATENT DOCUMENTS

| | | | | |
|---|---|---|---|---|
| 6,622,473 | B2 * | 9/2003 | Becquerelle | F01D 15/12 60/226.1 |
| 8,276,275 | B2 * | 10/2012 | Sheridan | F01D 25/18 29/893.1 |
| 8,646,978 | B2 * | 2/2014 | Jadczak | F16C 19/52 384/535 |
| 2004/0063504 | A1 | 4/2004 | Bouchy et al. | |

(Continued)

FOREIGN PATENT DOCUMENTS

| | | |
|---|---|---|
| EP | 2083150 | 7/2009 |
| EP | 3006680 | 4/2016 |

(Continued)

OTHER PUBLICATIONS

Extended European Search Report dated Dec. 1, 2016 in European Application No. 16178061.4.

*Primary Examiner* — Ninh H Nguyen

(57) ABSTRACT

A fan shaft includes a first end, a second end, and an axis, the fan shaft and configured to be coupled to a gear assembly of a gas turbine engine at the first end and to a fan more proximal to the second end than the first end such that in response to being coupled, the fan shaft can transfer torque from the gear assembly to the fan. At least one axial portion of the fan shaft satisfies the relationship $$0.55 \leq \frac{T*C}{J*\tau} \leq 0.95,$$

where T represents peak torque during fan blade off, C represents a distance from a centerline of the gas turbine engine to an outer fiber of the fan shaft, J represents a polar moment of inertia of the fan shaft, and $\tau$ represents yield stress in shear of the fan shaft.

19 Claims, 4 Drawing Sheets

(56) References Cited

U.S. PATENT DOCUMENTS

2012/0275904 A1   11/2012  McCune et al.
2013/0202442 A1*  8/2013  Ivakitch .................. F01D 5/066
                                                    416/210 A
2015/0308286 A1* 10/2015  Korshikov ............ F01D 21/045
                                                    60/779

FOREIGN PATENT DOCUMENTS

GB        2326679      12/1988
GB        2507003       4/2014
WO     2014182467      11/2014
WO     2015026899       2/2015

* cited by examiner

FBO TORQUE REDUCING FEATURE IN FAN SHAFT

FIELD

The present disclosure relates generally to the design of gas turbine engine fan shafts and, more particularly, to fan shaft design features intended to reduce the torque load transmitted to the engine structure during a fan blade off event.

BACKGROUND

Gas turbine engines typically include a fan section, a compressor section, a combustor section and a turbine section. A fan blade may fracture and become liberated from the fan rotor while a gas turbine engine is running. This is a potentially hazardous event known as Fan Blade Off (FBO). Immediately following blade liberation, severe rub interaction between the remaining fan blades and the fan case occurs. The rub interaction produces a large torque load which is transmitted through the fan shaft.

SUMMARY

What is described is a fan shaft having a first end, a second end, and an axis, the fan shaft and configured to be coupled to a gear assembly of a gas turbine engine at the first end and to a fan more proximal to the second end than the first end such that in response to being coupled, the fan shaft can transfer torque from the gear assembly to the fan. At least one axial portion of the fan shaft satisfies the relationship $$0.55 \le \frac{T*C}{J*\tau} \le 0.95,$$

where T represents peak torque during fan blade off, C represents a distance from a centerline of the gas turbine engine to an outer fiber of the fan shaft, J represents a polar moment of inertia of the fan shaft, and $\tau$ represents yield stress in shear of the fan shaft.

In any of the foregoing fan shafts, the fan shaft includes a first bearing configured to rotatably couple the fan shaft to a static structure.

In any of the foregoing fan shafts, the at least one portion is positioned between the first bearing and the first end of the fan shaft.

In any of the foregoing fan shafts, the fan shaft includes a first bearing and a second bearing configured to rotatably couple the fan shaft to a static structure.

In any of the foregoing fan shafts, the at least one portion is positioned between the first bearing and the second bearing.

Any of the foregoing fan shafts may further include at least one rib positioned circumferentially about an inner diameter surface of the at least one portion.

Any of the foregoing fan shafts may further include an outer groove positioned circumferentially about an outer diameter surface of the at least one portion.

In any of the foregoing fan shafts, the at least one rib is axially aligned with the outer groove.

Any of the foregoing fan shafts may further include a first inner groove positioned axially forward and adjacent to the at least one rib, the first inner groove having a forward surface extending radially outward as it approaches the at least one rib, as well as a second inner groove positioned axially aft and adjacent to the at least one rib, the second inner groove having an aft surface extending radially outward as it approaches the at least one rib.

Also described is a fan section of a gas turbine engine. The fan section includes a fan configured to rotate about a centerline. The fan section also includes a fan shaft configured to transfer torque to the fan and including a first bearing, a second bearing aft of the first bearing, and at least one rib positioned on an inner diameter surface of the fan shaft, the first bearing and the second bearing being configured to rotatably couple the fan shaft to a static structure.

In any of the foregoing fan sections, the at least one rib is positioned axially between the first bearing and the second bearing.

Any of the foregoing fan sections may also include an outer groove positioned circumferentially about an outer diameter surface of the fan shaft such that the at least one rib is axially aligned with the outer groove.

In any of the foregoing fan sections, at least a portion of the fan shaft between the first bearing and the second bearing satisfies the relationship $$0.55 \le \frac{T*C}{J*\tau} \le 0.95,$$

where T represents peak torque during fan blade off, C represents a distance from a centerline of the gas turbine engine to an outer fiber of the fan shaft, J represents a polar moment of inertia of the fan shaft, and $\tau$ represents yield stress in shear of the fan shaft.

In any of the foregoing fan sections, the fan shaft is configured to receive torque from a gear assembly and the gear assembly is configured to receive torque from a turbine section of the gas turbine engine.

Any of the foregoing fan sections may also include a first inner groove positioned axially forward and adjacent to the at least one rib, the first inner groove having a forward surface extending radially outward as it approaches the at least one rib, as well as a second inner groove positioned axially aft and adjacent to the at least one rib, the second inner groove having an aft surface extending radially outward as it approaches the at least one rib.

Also described is a gas turbine engine having an axis. The gas turbine engine includes a static structure, a low pressure turbine section, and an inner shaft coupled to the low pressure turbine section and configured to receive torque from the low pressure turbine section. The gas turbine engine also includes a gear assembly coupled to the inner shaft. The gas turbine engine also includes a fan shaft coupled to and configured to receive torque from the gear assembly, including a first bearing and a second bearing configured to allow rotation of the fan shaft relative to the static structure, the fan shaft having at least one portion that satisfies the relationship $$0.55 \le \frac{T*C}{J*\tau} \le 0.95.$$

T represents peak torque during fan blade off, C represents a distance from a centerline of the gas turbine engine to an outer fiber of the fan shaft, J represents a polar moment of inertia of the fan shaft, and $\tau$ represents yield stress in shear of the fan shaft The fan shaft also includes a fan coupled to the fan shaft and configured to rotate in response to torque being received by the fan shaft.

In any of the foregoing gas turbine engines, the at least one portion is positioned axially between the first bearing and the second bearing.

In any of the foregoing gas turbine engines, the fan shaft further includes at least one rib extending circumferentially about an inner diameter surface of the at least one portion.

In any of the foregoing gas turbine engines, the fan shaft further includes an outer groove extending circumferentially about an outer diameter surface of the at least one portion.

In any of the foregoing gas turbine engines, the fan shaft further includes a first inner groove positioned axially forward and adjacent to the at least one rib, the first inner groove having a forward surface extending radially outward as it approaches the at least one rib, as well as a second inner groove positioned axially aft and adjacent to the at least one rib, the second inner groove having an aft surface extending radially outward as it approaches the at least one rib.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
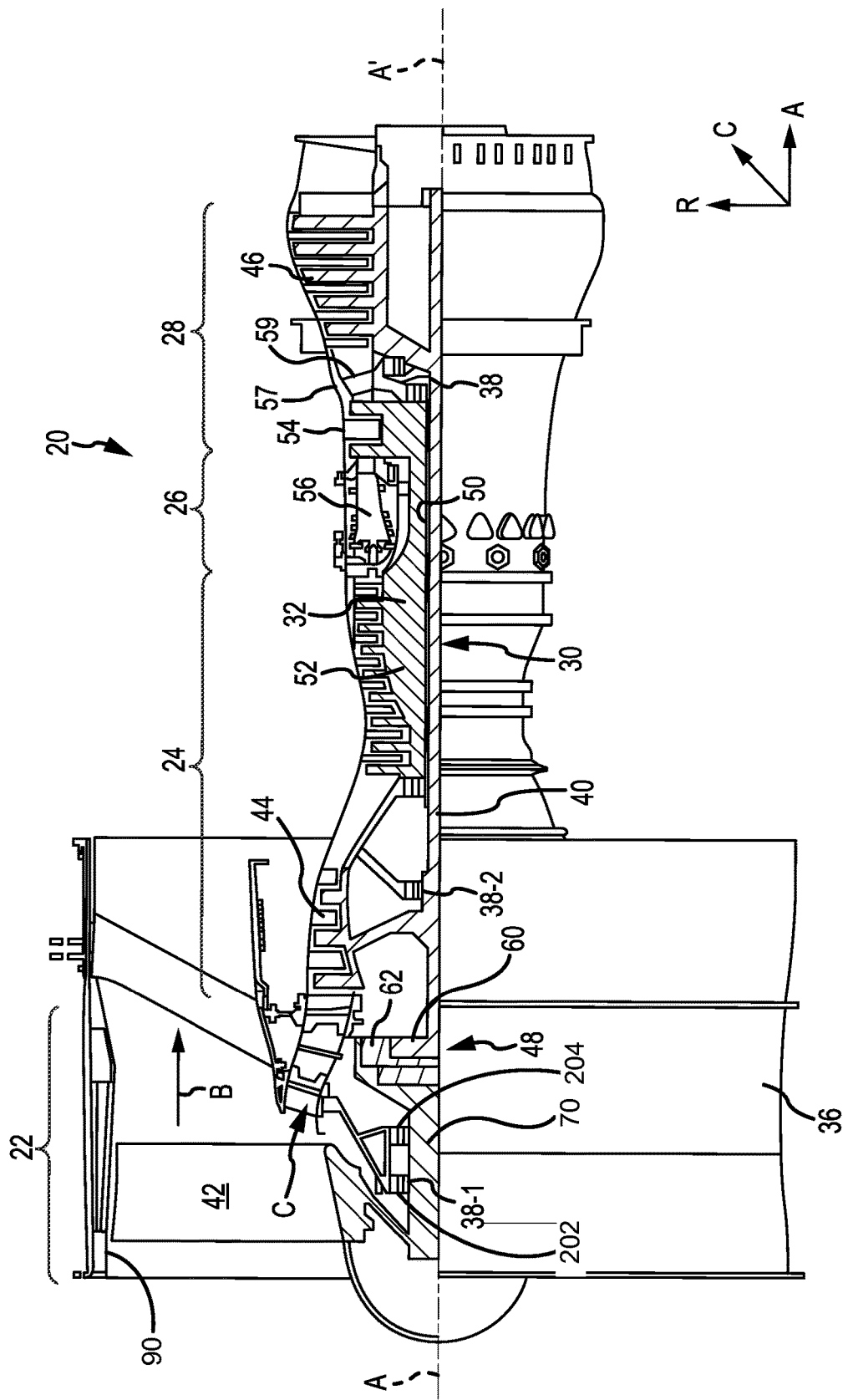
FIG. 1 is a cross-sectional view of an exemplary gas turbine engine, in accordance with various embodiments.

With reference to FIG. 1, a gas turbine engine 20 is provided. An A-R-C axis illustrated in each of the figures illustrates the axial (A), radial (R) and circumferential (C) directions. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction.

Gas turbine engine 20 may be a two-spool turbofan that generally incorporates a fan section 22, a compressor section 24, a combustor section 26 and a turbine section 28. Alternative engines include an augmentor section among other systems or features. In operation, fan section 22 drives air along a bypass flow-path B while compressor section 24 drives air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 generally includes an inner shaft 40 that interconnects a fan 42, a low pressure (or first) compressor section 44 and a low pressure (or first) turbine section 46. Inner shaft 40 is connected to fan 42 through a geared architecture 48 that can drive fan 42 at a lower speed than low speed spool 30. Fan 42 may be enclosed by a fan case 90 radially outward from fan 42. Geared architecture 48 includes a gear assembly 60 enclosed within a gear housing 62. Gear assembly 60 couples inner shaft 40 to a fan shaft 70 that is coupled to a rotating fan structure, including fan 42. Fan shaft 70 is coupled to engine static structure 36 by bearing system which, in various embodiments, includes a first bearing 202 and a second bearing 204 that is aft of first bearing 202. High speed spool 32 includes an outer shaft 50 that interconnects a high pressure (or second) compressor section 52 and high pressure (or second) turbine section 54. A combustor 56 is located between high pressure compressor 52 and high pressure turbine 54. A mid-turbine frame 57 of engine static structure 36 is located generally between high pressure turbine 54 and low pressure turbine 46. Mid-turbine frame 57 supports one or more bearing systems 38 in turbine section 28. Inner shaft 40 and outer shaft 50 are concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C is compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 is a high-bypass ratio geared aircraft engine. The bypass ratio of gas turbine engine 20 may be greater than about six (6). The bypass ratio of gas turbine engine 20 may also be greater than ten (10:1). Geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). The diameter of fan 42 may be significantly larger than that of the low pressure compressor section 44, and the low pressure turbine 46 may have a pressure ratio that is greater than about five (5:1). The pressure ratio of low pressure turbine 46 is measured prior to inlet of low pressure turbine 46 as related to the pressure at the outlet of low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced, which may shorten the operational life of current components.

Figure 2:
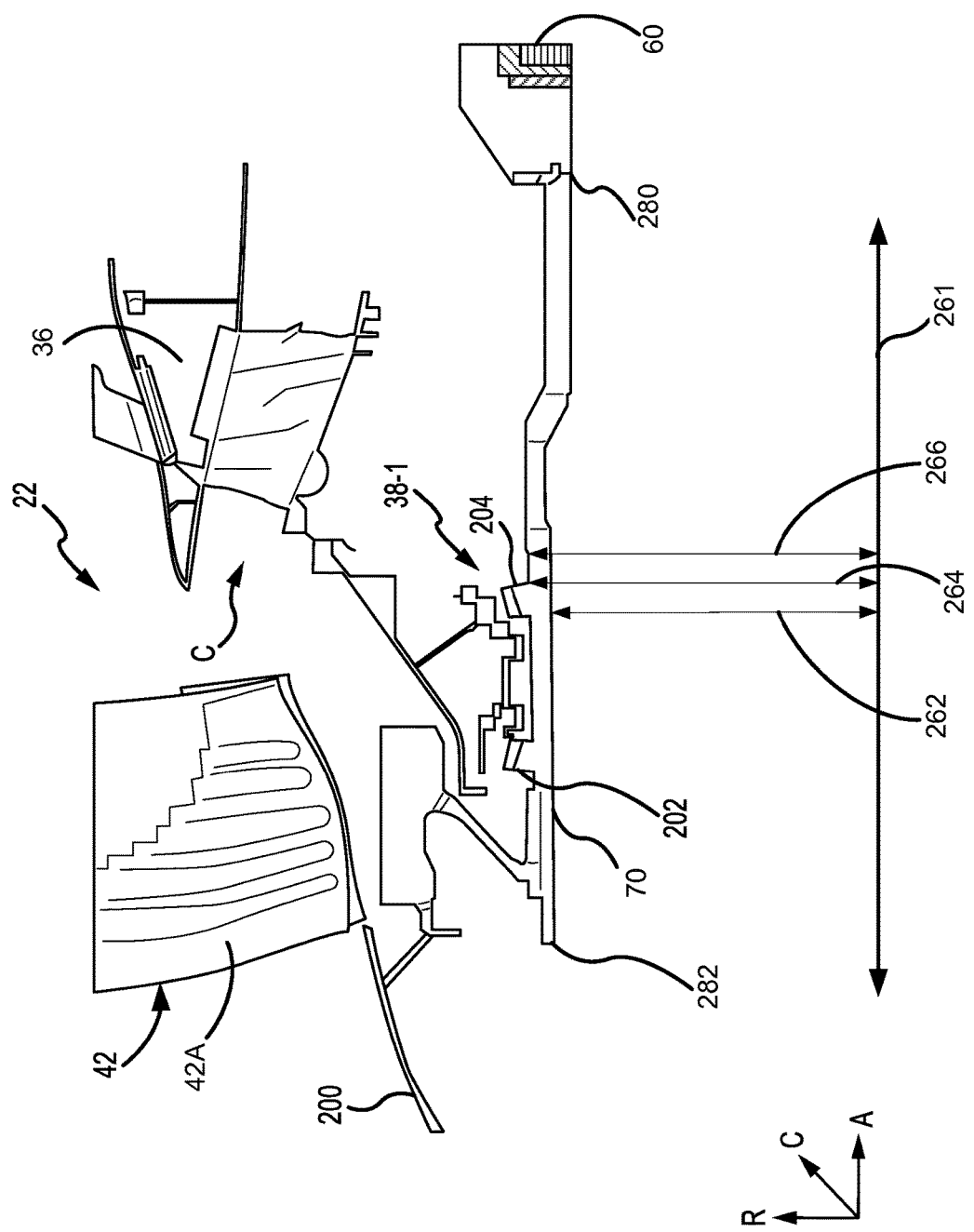
FIG. 2 is a cross-sectional view of a fan section of the gas turbine engine of FIG. 1, in accordance with various embodiments.

With reference now to FIG. 2, a portion of fan section 22 is illustrated. Fan shaft 70 has a first end 280 that is coupled to gear assembly 60 and a second end 282. A fan blade 42A of fan 42 is coupled to fan shaft 70 near second end 282. Stated differently, fan blade 42A is more proximal second end 282 than first end 280. Fan shaft 70 is coupled to static structure 36 via one or more bearings, which may be included in bearing system 38-1 as a first bearing 202 and a second bearing 204 that is positioned aft of first bearing 202.

Fan shaft 70 may have a cylindrical shape and be positioned circumferentially about a centerline 261. In response to input torque being received at gear assembly 60, gear assembly 60 causes fan shaft 70 to rotate about centerline 261. Fan blade 42A is coupled to fan shaft 70 such that fan 42 (and thus fan blade 42A) rotates about centerline 261 at the same angular velocity as fan shaft 70. In various embodiments, fan shaft 70 is also coupled to a spinner cap 200 that may rotate about centerline 261 along with fan shaft 70 and fan blade 42A.

With reference now to FIGS. 1 and 2, gas turbine engine 20 may be subject to a fan blade off (FBO) event. During FBO, while gas turbine engine 20 is operating such that fan 42 is rotating about centerline 261, an event causes fan blade 42A becomes liberated from fan 42 and, thus, fan shaft 70. This results in a rotating centrifugal load that causes fan 42 to skew to a side of fan 42 opposing fan blade 42A. Other fan blades of fan 42 may drag on fan case 90, resulting in deceleration of fan shaft 70. Much of the resulting force is absorbed by fan shaft 70 near bearing system 38-1.

In traditional gas turbine engines, fan shafts are designed to allow a relatively small amount of torsional yielding during FBO. However, fan shaft 70 is designed to allow a predetermined amount of torsional yielding. The torsional yielding of fan shaft 70 safely dissipates energy and thus reduces the potentially destructive torque load transmitted to the rest of gas turbine engine 20. In particular, fan shaft 70 may be designed to allow torsional yielding between first bearing 202 and second bearing 204. For example, a one percent (1%) increase in torsional yielding can reduce peak torque transmitted through the fan shaft during FBO by as much as 30%.

In order to achieve a desirable amount of torsional yielding of fan shaft 70, the portion of fan shaft 70 designed to allow the torsional yielding (such as the portion between first bearing 202 and second bearing 204) should satisfy equation 1 below. Satisfaction of equation 1 has an additional benefit of reducing maneuver bending loads transmitted from an overhung fan to gear assembly 60.

$$0.55 \leq \frac{T*C}{J*\tau} \leq 0.95 \qquad \text{Equation 1}$$

In equation 1, $\tau$ represents yield stress in shear (material strength) and is a material property. Thus, the value of $\tau$ is based on selection of material of fan shaft 70 and/or heat treating of the material of fan shaft 70. T represents peak torque during FBO. Thus, the value of T is based on the architecture of gas turbine engine 20 as well as any external loads applied, such as the charge. C represents the distance from centerline 261 to the outer fiber of fan shaft 70, as shown by radius 266. Thus, the value of C is based on the geometry of fan shaft 70. J represents the polar moment of inertia of fan shaft 70. The polar moment of inertia of fan shaft 70 is determined based on radius 262 from centerline 261 to the inner edge of fan shaft 70 and radius 264 which from centerline 261 to the outer metal of fan shaft 70. Thus, the value of J is also based on the geometry of fan shaft 70. Accordingly, the material of fan shaft 70, the architecture of gas turbine engine 20, external loads applied to gas turbine engine 20, and/or the geometry of fan shaft 70 may be adjusted in order for fan shaft 70 to satisfy equation 1.

Figure 3:
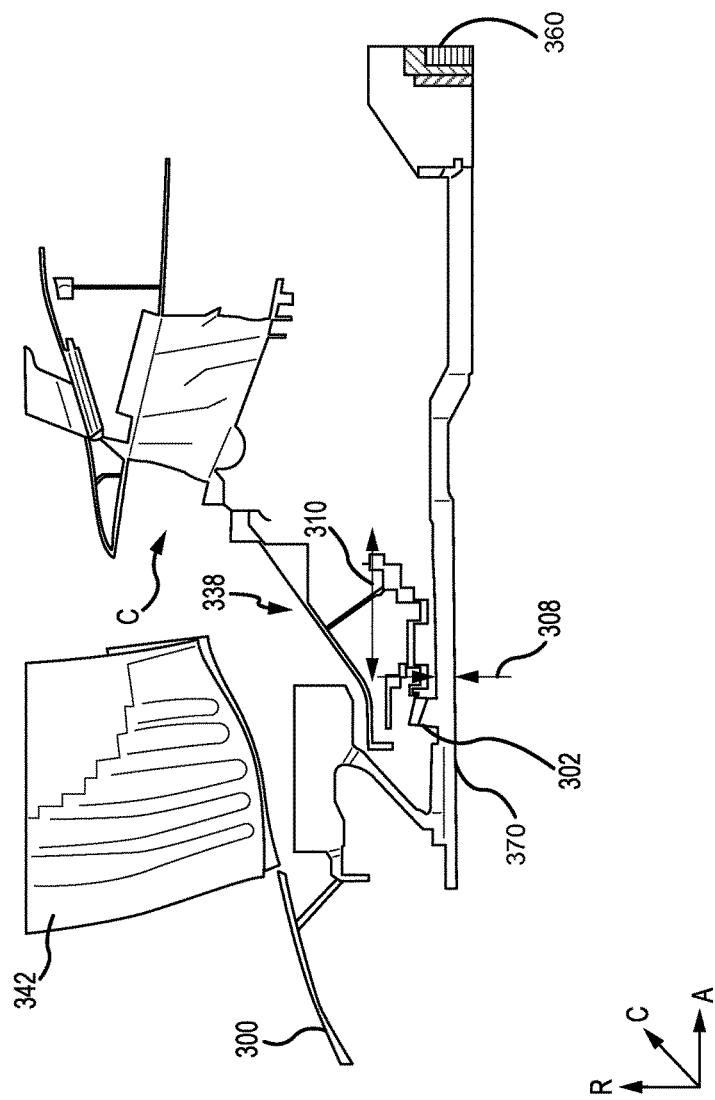
FIG. 3 is a cross-sectional view of a fan section of a gas turbine engine, in accordance with various embodiments.

With reference to FIG. 3, a fan shaft 370 may be coupled to a gear assembly 360 and one or more fan blades of a fan 342. In FIG. 3, a bearing system 338 includes a first bearing 302 but does not include a second bearing. Thus, it is desirable for equation 1 to be satisfied by at least one portion of fan shaft 370 between gear assembly 360 and first bearing 302. For example, it may be desirable for fan shaft 370 to satisfy equation 1 between first bearing 302 and a point halfway, or one third of the way, or two thirds of the way between first bearing and gear assembly 360.

Figure 4:
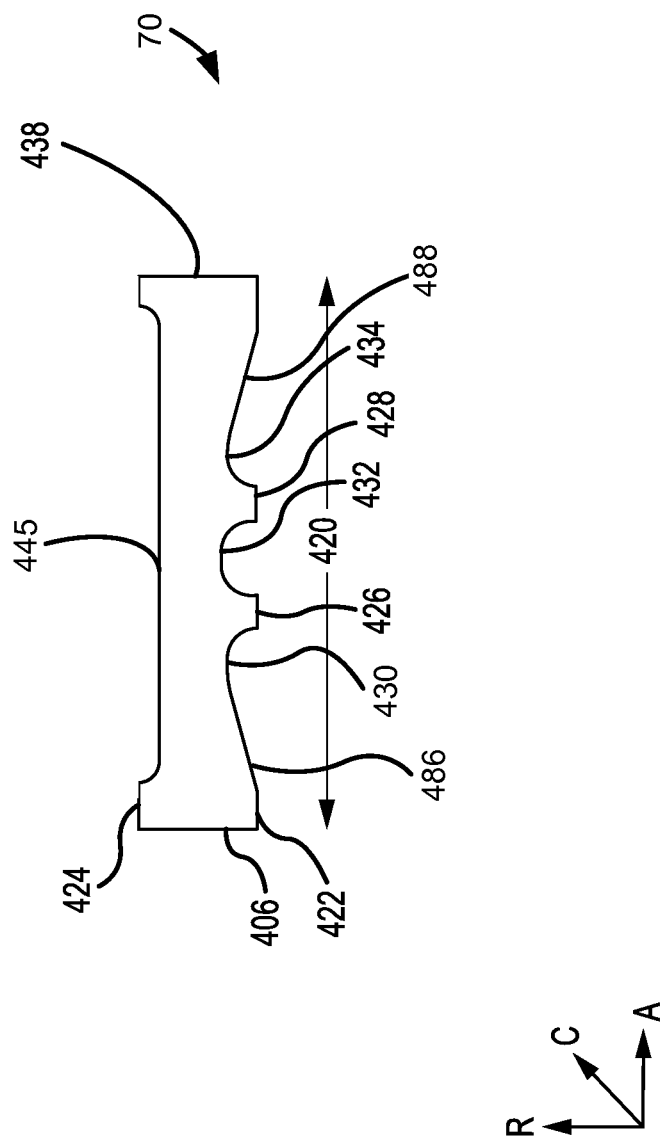
FIG. 4 is a cross-sectional view of a fan shaft of the fan section of FIG. 2, in accordance with various embodiments.

With reference now to FIGS. 2 and 4, a portion 438 of the fan shaft 70 may be positioned between first bearing 202 and second bearing 204, may extend from first bearing 202 to second bearing 204, may be positioned between first bearing 202 and gear assembly 60, may extend between first bearing 202 and gear assembly 60, and/or may extend between first bearing 202 and a point halfway between, one third of the way to, or two thirds of the way from first bearing 202 and gear assembly 60.

With reference directed to FIG. 4, portion 438 of fan shaft 70 may have an axial distance 420. In various embodiments, portion 438 may satisfy equation 1 at every point over axial distance 420 and/or may on average satisfy equation 1 over portion 438. For example, some areas of fan shaft 70 over axial distance 420 may not satisfy equation 1 and some may satisfy equation 1, but the average of fan shaft 70 over axial distance 420 may satisfy equation 1.

Portion 438 may have an outer diameter surface 424 and an inner diameter surface 422 radially inward from outer diameter surface 424. Portion 438 may include one or more ribs including a rib 426 and a rib 428. Rib 426 and rib 428 may be positioned on inner diameter surface 422 and may extend circumferentially about inner diameter surface 422. The ribs may reduce the likelihood of fan shaft 70 buckling during FBO.

A first inner groove 430 may be positioned axially forward of rib 426 and a second inner groove 434 may be positioned axially aft of rib 428. A third inner groove 432 may be positioned between rib 426 and rib 428. First inner groove 430 may have a forward surface 486 that extends radially outward as it approaches rib 426 and second inner groove 434 may have an aft surface 488 that extends radially outward as it approaches rib 428.

Portion 438 may have an outer groove 445 positioned on outer diameter surface 424. Outer groove 445 may extend circumferentially about outer diameter surface 424. Outer groove 445 may have an axial length that is at least half of axial distance 420. In various embodiments, outer groove 445 is axially aligned with rib 426 and rib 428 and, in various embodiments, may be axially aligned with first inner groove 430 and second inner groove 434. In various embodiments, portion 438 satisfies equation 1 at all points, or on average, between an axially forward end of forward surface 486 and an axially aft end of aft surface 488.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fan shaft comprising:
a first end, a second end, and an axis, the fan shaft configured to be coupled to a gear assembly of a gas turbine engine at the first end and to a fan more proximal to the second end than the first end such that in response to being coupled, the fan shaft can transfer torque from the gear assembly to the fan, wherein at least one axial portion of the fan shaft satisfies the relationship $$0.55 \le \frac{T*C}{J*\tau} \le 0.95,$$

where T represents peak torque during fan blade off, C represents a distance from a centerline of the gas turbine engine to an outer fiber of the fan shaft, J represents a polar moment of inertia of the fan shaft, and $\tau$ represents yield stress in shear of the fan shaft.

2. The fan shaft of claim 1, wherein the fan shaft includes a first bearing configured to rotatably couple the fan shaft to a static structure.

3. The fan shaft of claim 2, wherein the at least one axial portion is positioned between the first bearing and the first end of the fan shaft along the axis of the shaft.

4. The fan shaft of claim 1, wherein the fan shaft includes a first bearing and a second bearing configured to rotatably couple the fan shaft to a static structure.

5. The fan shaft of claim 4, wherein the at least one axial portion is positioned between the first bearing and the second bearing.

6. The fan shaft of claim 1, further comprising at least one rib positioned circumferentially about an inner diameter surface of the at least one axial portion.

7. The fan shaft of claim 6, further comprising an outer groove positioned circumferentially about an outer diameter surface of the at least one axial portion.

8. The fan shaft of claim 7, wherein the at least one rib is axially aligned with the outer groove.

9. The fan shaft of claim 6, further comprising:
a first inner groove positioned axially forward and adjacent to the at least one rib, the first inner groove having a forward surface extending radially outward as it approaches the at least one rib; and
a second inner groove positioned axially aft and adjacent to the at least one rib, the second inner groove having an aft surface extending radially outward as it approaches the at least one rib.

10. A fan section of a gas turbine engine comprising:
a fan configured to rotate about a centerline; and
a fan shaft configured to transfer torque to the fan and including a first bearing, a second bearing aft of the first bearing, and at least one rib positioned on an inner diameter surface of the fan shaft, the first bearing and the second bearing being configured to rotatably couple the fan shaft to a static structure,
wherein at least a portion of the fan shaft between the first bearing and the second bearing satisfies the relationship $$0.55 \le \frac{T*C}{J*\tau} \le 0.95,$$

where T represents peak torque during fan blade off, C represents a distance from the centerline of the gas turbine engine to an outer fiber of the fan shaft, J represents a polar moment of inertia of the fan shaft, and $\tau$ represents yield stress in shear of the fan shaft.

11. The fan section of claim 10, wherein the at least one rib is positioned axially between the first bearing and the second bearing.

12. The fan section of claim 11, further comprising an outer groove positioned circumferentially about an outer diameter surface of the fan shaft such that the at least one rib is axially aligned with the outer groove.

13. The fan section of claim 12, wherein the fan shaft is configured to receive torque from a gear assembly and the gear assembly is configured to receive torque from a turbine section of the gas turbine engine.

14. The fan section of claim 10, further comprising:
a first inner groove positioned axially forward and adjacent to the at least one rib, the first inner groove having a forward surface extending radially outward as it approaches the at least one rib; and
a second inner groove positioned axially aft and adjacent to the at least one rib, the second inner groove having an aft surface extending radially outward as it approaches the at least one rib.

15. A gas turbine engine having an axis and comprising:
a static structure;
a low pressure turbine section;
an inner shaft coupled to the low pressure turbine section and configured to receive torque from the low pressure turbine section;
a gear assembly coupled to the inner shaft;
a fan shaft coupled to and configured to receive torque from the gear assembly, including a first bearing and a second bearing configured to allow rotation of the fan shaft relative to the static structure, the fan shaft having at least one portion that satisfies the relationship $$0.55 \le \frac{T*C}{J*\tau} \le 0.95,$$

where T represents peak torque during fan blade off, C represents a distance from a centerline of the gas turbine engine to an outer fiber of the fan shaft, J represents a polar moment of inertia of the fan shaft, and $\tau$ represents yield stress in shear of the fan shaft; and
a fan coupled to the fan shaft and configured to rotate in response to torque being received by the fan shaft.

16. The gas turbine engine of claim 15, wherein the at least one portion is positioned axially between the first bearing and the second bearing.

17. The gas turbine engine of claim 15, wherein the fan shaft further includes at least one rib extending circumferentially about an inner diameter surface of the at least one portion.

18. The gas turbine engine of claim 17, wherein the fan shaft further includes an outer groove extending circumferentially about an outer diameter surface of the at least one portion.

19. The gas turbine engine of claim 17, wherein the fan shaft further includes:
a first inner groove positioned axially forward and adjacent to the at least one rib, the first inner groove having a forward surface extending radially outward as it approaches the at least one rib; and
a second inner groove positioned axially aft and adjacent to the at least one rib, the second inner groove having an aft surface extending radially outward as it approaches the at least one rib.

\* \* \* \* \*